Oct. 17, 1944.  A. H. BENNETT ET AL  2,360,641
LENS AND PROCESS OF MAKING SAME
Filed Aug. 14, 1940  3 Sheets—Sheet 1
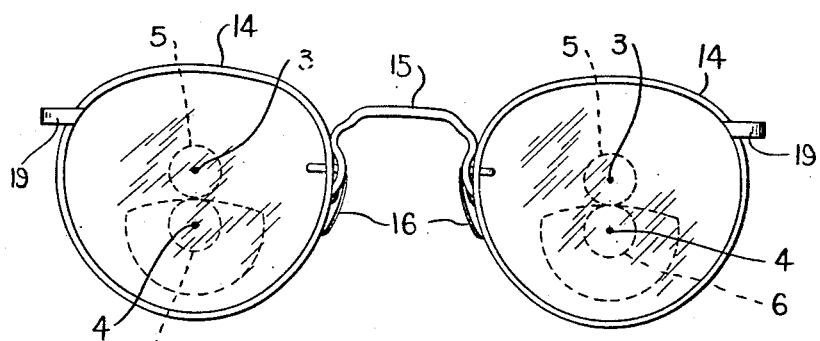
Fig. I
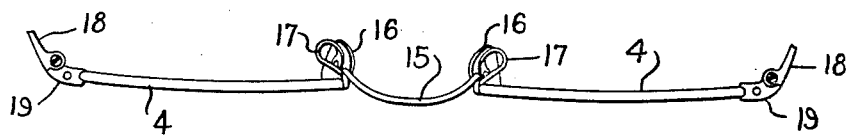
Fig. II
organic transparent plastic major portion
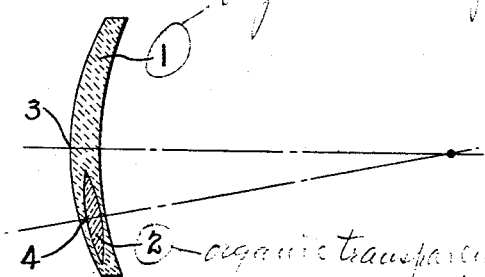
Fig. III  organic transparent plastic minor portion
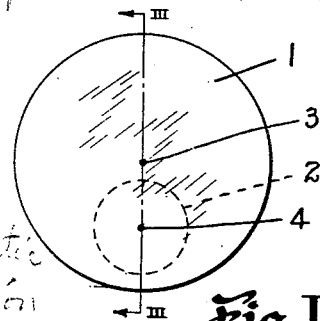
Fig. IV
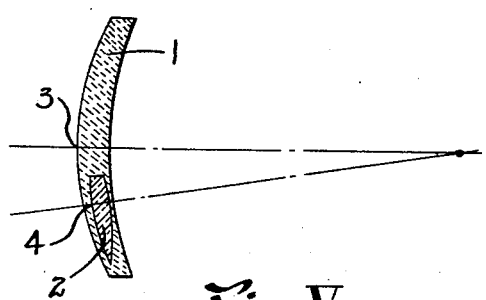
Fig. V
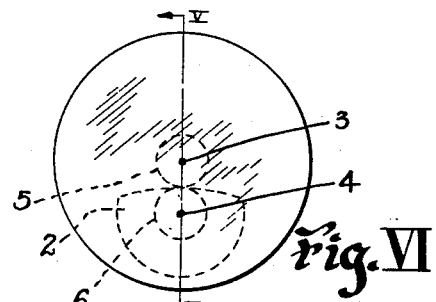
Fig. VI
INVENTOR.
ALVA H. BENNETT
ROGER S. ESTEY
HARRY H. STYLL
BY Harry H. Styll
ATTORNEY.

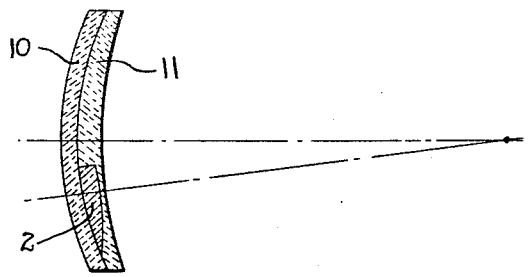
Fig. VII
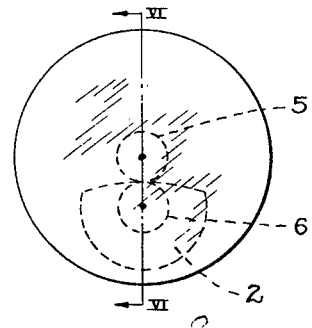
Fig. VIII
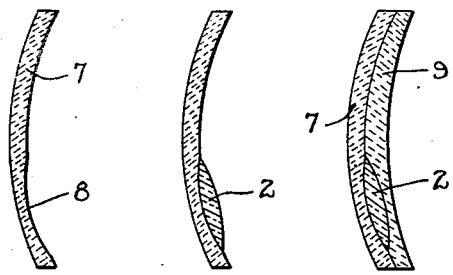
Fig. IX   Fig. X   Fig. XI
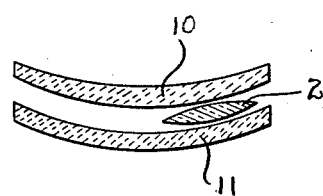
Fig. XII
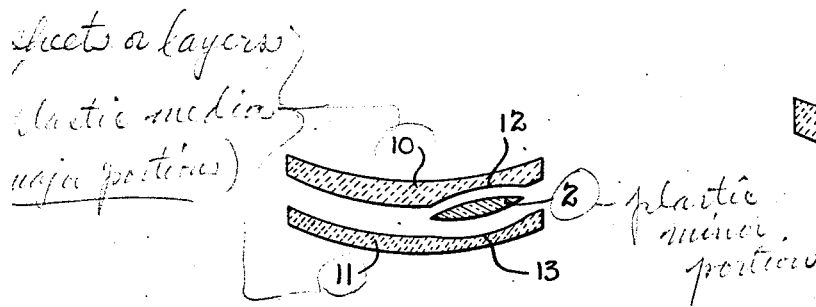
Fig. XIV
Fig. XIII

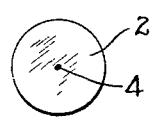 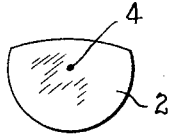 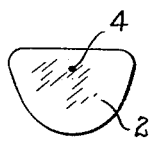 
Fig. XV    Fig. XVI    Fig. XVII    Fig. XVIII
 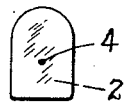  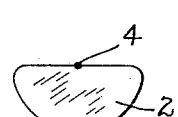
Fig. XIX    Fig. XX    Fig. XXI    Fig. XXII
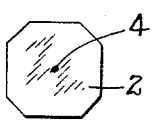 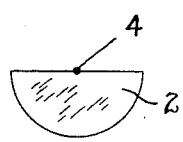 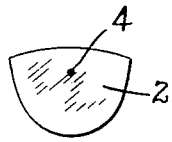
Fig. XXIII    Fig. XXIV    Fig. XXV
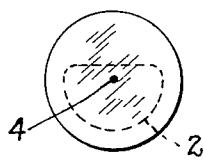 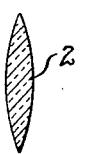 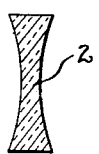 
Fig. XXVI    Fig. XXVII    Fig. XXVIII    Fig. XXIX
INVENTOR.
ALVA H. BENNETT
ROGER S. ESTEY
HARRY H. STYLL
BY
Harry H. Styll. ATTORNEY.

Patented Oct. 17, 1944

2,360,641

UNITED STATES PATENT OFFICE 2,360,641

LENS AND PROCESS OF MAKING SAME

Alva H. Bennett, Kenmore, and Roger S. Estey, Buffalo, N. Y., and Harry H. Styll, Southbridge, Mass., assignors to American Optical Company, Southbridge, Mass., a voluntary association of Massachusetts Application August 14, 1940, Serial No. 352,590

8 Claims. (Cl. 88—54)

This invention relates to improvements in multifocal or bifocal lenses and to improved processes for making the same.

One of the principal objects of the invention is to provide a multifocal or bifocal lens wherein a minor lens is entirely embedded in a major lens portion having a lower melting point and to provide improved processes of making the same.

Another object of the invention is to provide a multifocal or bifocal lens having a major portion of an organic transparent plastic resinous lens medium and a minor portion of an inorganic transparent lens medium entirely embedded therein and to provide improved processes of making the same.

Another object of the invention is to provide a multifocal or bifocal lens having a minor portion or segment of any desired contour shape, and with any desired surfaces on the two faces thereof.

Another object of the invention is to provide a multifocal or bifocal lens in which the relationship of the optical center of the major portion with that of the minor portion may be placed or positioned as desired.

Another object of the invention is to provide facile and economical means of making such multifocal or bifocal lenses.

Another object is to make a bifocal or multifocal lens with a major portion of an organic plastic and a minor portion of glass.

Another object of the invention is to provide an improved multifocal or bifocal lens having an embedded minor portion which has any desired contour shape comprising shapes not obtainable with glass lenses as well as those that are obtainable with glass lenses, and having finished optical surfaces on its faces not obtainable in glass lenses as well as those that are obtainable in such lenses, and to new and improved processes of obtaining these objects.

Another object of the invention is to provide a multifocal or bifocal lens with a minor portion that is universally adaptable to positioning the optical center to any desired contour shape and size and to any lens surface and power requirement of its faces.

Another object is to provide an improved multifocal or bifocal lens having centering, shaping and surfacing characteristics not obtainable in glass lenses as well as those that are obtainable.

Other objects and advantages of the invention will become apparent from the following description taken in conjunction with the accompanying drawings. It will be apparent that many changes in the details of construction and arrangement of parts and in the steps of the processes may be made without departing from the invention as expressed in the accompanying claims in view of which it is desired not to limit the invention to the matters shown and described as the preferred forms have been set forth by the way of illustration only.

Referring to the drawings:

Fig. I is a front view of a spectacle embodying the invention;

Fig. II is a top view of Fig. I;

Fig. III is a cross section on line III—III of Fig. IV;

Fig. IV is a front view of a lens embodying the invention;

Fig. V is a cross section on line V—V of Fig. VI;

Fig. VI is a front view of a lens embodying another form of the invention;

Fig. VII is a cross section on line VII—VII of Fig. VIII;

Fig. VIII is a front view of a lens embodying yet another form of the invention;

Fig. IX, Fig. X and Fig. XI are cross sections showing three stages in the formation of a lens of the invention;

Fig. XII is a cross section of a lens, the parts aligned but separated, to show the formation of the lens;

Fig. XIII is a cross section through the completed lens of Fig. XII;

Fig. XIV is a cross section of a lens, the parts aligned but separated, to show the formation of the lens;

Figs. XV to XXV inclusive are front views of various shaped segments for minor lens portions;

Fig. XXVI is a front view of a minor portion showing one cutting of same to shape along the dotted line;

Fig. XXVII to Fig. XXIX inclusive are possible vertical cross sections of Fig. XXVI showing positive, negative, and prismatic forms of lenses respectively.

Referring to the drawings wherein corresponding parts are indicated by corresponding characters:

In Fig. III is shown a multifocal or bifocal lens having a major portion 1 of an organic transparent plastic resinous lens medium, and a minor portion 2 of an inorganic transparent lens medium such as glass, this minor portion 2 may also be made of a plastic of higher melting point than the major portion. The minor portion 2 is entirely embedded in the major portion 1. The outer faces of both the minor and major portions have finished optical lens surfaces. The lens surfaces of the minor portion if of glass are ground and polished, if of plastic they may be molded also. The lens surfaces of the major portion may be molded or they may be ground and polished, or one face may be molded and the other ground and polished, etc. The optical center of the major portion is at 3, that of the minor portion is at 4. The shape of the minor portion may be any desired shape, and the optical centers 3 and 4 may be related as desired. These are important factors in this invention.

In Figs. V and VI the top of the minor portion 2 has been cut off to form a straight horizontal line and the centers 3 and 4 related to each other so that the centers 3 and 4 are located on opposite sides of the top line of the minor portion by an amount equal to half of the diameter of the pupil of the eye. The pupil of the eye is represented by the dotted circles 5 and 6. The reason for this centering is to have the eye in alignment with the optical center of the portion of the lens being used just as soon as the eye clears the top line of the minor portion. This is considered the ideal centering.

The lenses of Figs. III, IV, V and VI may be made by first making the minor portion 2 complete with lens surfaces, supporting the minor portion in a mold and molding the plastic material of the major portion around it. This may be done by using a powdered plastic and forcing it in the mold under heat and pressure. The powder is heated until it becomes plastic so it may be pressed to shape in the mold. Liquid plastic also may be used. The liquid is in the unpolymerized condition. After it is poured it is left to set and polymerize. It is set with advantage under heat and pressure. This is a form of casting.

This lens may also be made as indicated in Figs. IX, X, and XI by a premolding process. The section 7 is first molded with the recess 8. The minor portion 2 is then inserted in the recess 8 and the second section 9 of the major portion molded over the insert 2 onto the first section 7, the molding being done under heat and pressure.

In Figs. VII and VIII the lens is made by taking sheets or layers of the plastic medium 10 and 11 and placing the insert 2 between them, as indicated in Fig. XII, then pressing the assembled parts together under heat and pressure until the insert 2 is completely embedded and the layers 10 and 11 adhere to each other and form an integral uniform unification producing a completed lens, as shown in Figs. VII and XIII. Lens surfaces are made on both the minor and major fields, either by grinding and polishing or by molding. Any shape of minor field may be used and any desired relationship of optical centers obtained.

If desired, the recesses 12 and 13, Fig. XIV, may be pre-shaped before pressing the parts together.

In Figs. I and II, lenses of the invention are shown mounted in a spectacle frame comprising rims 14, united by a bridge member 15, and having nose guards 16 carried by the arms 17. The temples 18 are pivoted to the endpieces 19. The lenses may be mounted in rimless mountings or any form of ophthalmic mounting desired.

There are several important features and advantages of the invention not present in other forms of bifocal or multifocal lenses.

Probably the most important feature is that the relationship of the optical centers may be fixed as desired with any shape of minor field desired. This could not be done with the glass lenses of the prior art.

Another important feature is that of economy obtained by substituting molding operations for grinding and polishing.

Plastic resins have now been developed and produced that can be ground and polished. This permits one side of the major portion to be molded and the other ground and polished, making it possible to have the prescription grinder put on the second side of the lens in dispensing it.

By referring to Figs. XXVI to XXIX inclusive, the versatility of the adaptation of the minor portion may be noted. This portion is made as a complete small lens by grinding and polishing methods if of glass, or by molding as well if of plastic. The lens surfaces on the two faces may be of any desired form, spherical, plano, toric, cylindrical or aspherical. The type of lens may be of any desired form such as positive or negative, biconvex, biconcave, bitoric, plano spherical, plano toric, plano cylindrical, prismatic. The contour shape may also be as desired by cutting the lens to desired shape as indicated by the dotted line in Fig. XXVI. These shapes may be square, circular, semi-circular, oval, elliptical, oblong, or any shape desired. The optical center may be located also as desired by the shaping of the lens surfaces and the cutting to required shape. The minor portion may be placed in any desired position with relation to the major portion.

It is clear that many shapes of minor lens may be used that were not possible in glass lenses where the minor portion had to fit into a portion ground in the major portion. In glass lenses the shapes were limited by the possibility of grinding. Here any shape may be used. Also many lens surfaces on the minor portion may be used that could not be used in glass lenses because of the limitations of grinding as aforesaid. Also the optical centers of the major portion and the minor portion may be related in many positions not obtainable in glass lenses because of the said limitation of grinding. In this invention all the characteristics obtainable in glass lenses are obtainable as well as those not obtainable in such lenses. This invention obtains a universal adaptability of the minor portion because it may be made as a separate and distinct lens before it is incorporated in the major portion. The advantages and the economy obtainable are obvious.

From the foregoing it will be seen that there have been provided simple, efficient and economical means for obtaining all the objects and advantages of the invention.

Having described the invention, the following is claimed:

1. A bifocal or multifocal lens comprising a major portion of transparent non-laminous organic, plastic resin lens medium with finished optical lens surfaces on its faces of required optical power and an optical center located in a desired position relative to the bounding edges and a minor portion of transparent lens medium having a higher melting point than the major portion with finished optical lens surfaces on its faces of required optical power embedded in and entirely surrounded by the non-laminous major portion, said minor portion being a segment of a finished optical lens having an optical center at a distance below its top edge substantially equal to half the diameter of the pupil of the eye, and having its side and bottom edges in desired relation to said optical center and the optical center of the major portion positioned above said top edge of the minor portion a distance substantially equal to half the diameter of the pupil of the eye.

2. The process of making a bifocal or multifocal lens comprising molding entirely around an inorganic lens member having a relatively high melting point and having finished optical surfaces, a second lens member of an organic transparent plastic resin of a lower melting point, and making finished optical lens surfaces on the faces of said outer lens member.

3. The process of making a bifocal or multifocal lens comprising compressing under heat and pressure an inorganic lens member having finished optical surfaces on its faces between spaced layers of an organic transparent plastic resin lens medium to cause said medium to flow until the inorganic lens member is completely embedded therein and the two layers of the plastic have adhered together forming a unitary structure, and simultaneously making finished optical lens surfaces on the two outer faces of the organic plastic medium.

4. The process of making a bifocal or multifocal lens comprising making a minor lens portion of a lens medium of relatively high melting point with finished optical lens surfaces on its faces of desired configuration and optical power removing a portion of said lens portion at a selected distance above the optical center, and evening or shaping the side and bottom portions to give a desired contour shape to said minor portion, embedding said completed minor portion in a non-laminous major portion of a lens medium of a lower melting point, and simultaneusly making finished optical surfaces on the faces of said major portion of desired conformation and optical power with the optical center of said major portion spaced a desired distance above the top edge of the minor portion simultaneously reducing said major portion to a controlled thickness.

5. The process of making a bifocal or multifocal lens comprising making a minor lens portion of a lens medium of relatively high melting point with finished optical lens surfaces on its faces of desired configuration and optical power removing a portion of said lens portion at a selected distance above the optical center, and evening or shaping the side and bottom portions to give a desired contour shape to said minor portion and compressing under heat and pressure the said minor portion between layers of a lens medium of lower melting point to cause said layers to flow and embed the said minor portion and to compress the said layers together to form an integral homogeneous major portion around the minor portion, and simultaneously making finished optical surfaces on the faces of said major portion of desired conformation and optical power with the optical center of said major portion spaced a desired distance above the top edge of the minor portion.

6. The process of forming a multifocal lens comprising forming a segment of lens medium of controlled size and shape having a relatively high melting point with finished optical surfaces on the opposed sides thereof, flowing a mass of transparent plastic resinous lens medium about said segment and simultaneously shaping said plastic resinous lens medium to a non-laminous mass of a given thickness greater than the thickness of the segment and to simultaneously form finished optical surfaces on the opposed sides thereof overlying the side surfaces of the segment, with said surfaces being controlled as to curvatures so as to introduce the prescriptive power desired through one focal field of the lens and to function cooperatively with the curved surfaces on the second portion on the lens medium to produce the focal power desired through the segment field of the lens.

7. The process of making a bifocal or multifocal lens blank comprising molding entirely around a lens member of controlled size and shape and of a material having a relatively high melting point with finished optical surfaces on the opposed sides thereof, a second lens member of an organic transparent resin of a lower melting point and simultaneously making a finished optical lens surface on at least one of the outer surfaces of the second member.

8. The process of making a bifocal or multifocal lens blank comprising compressing under heat and pressure an inorganic lens member having finished optical surfaces on its face between spaced layers of an inorganic plastic resin lens medium to cause said medium to flow until the inorganic lens member is completely imbedded therein and the two layers of the plastic have adhered together forming a unitary structure, and simultaneously making a finished optical lens surface on at least one of the outer faces of the organic plastic medium.

ALVA H. BENNETT.
ROGER S. ESTEY.
HARRY H. STYLL.